Dec. 19, 1939. R. L. E. REUTER ET AL 2,183,921
TUBE DEFORMER
Filed June 28, 1937 4 Sheets-Sheet 4

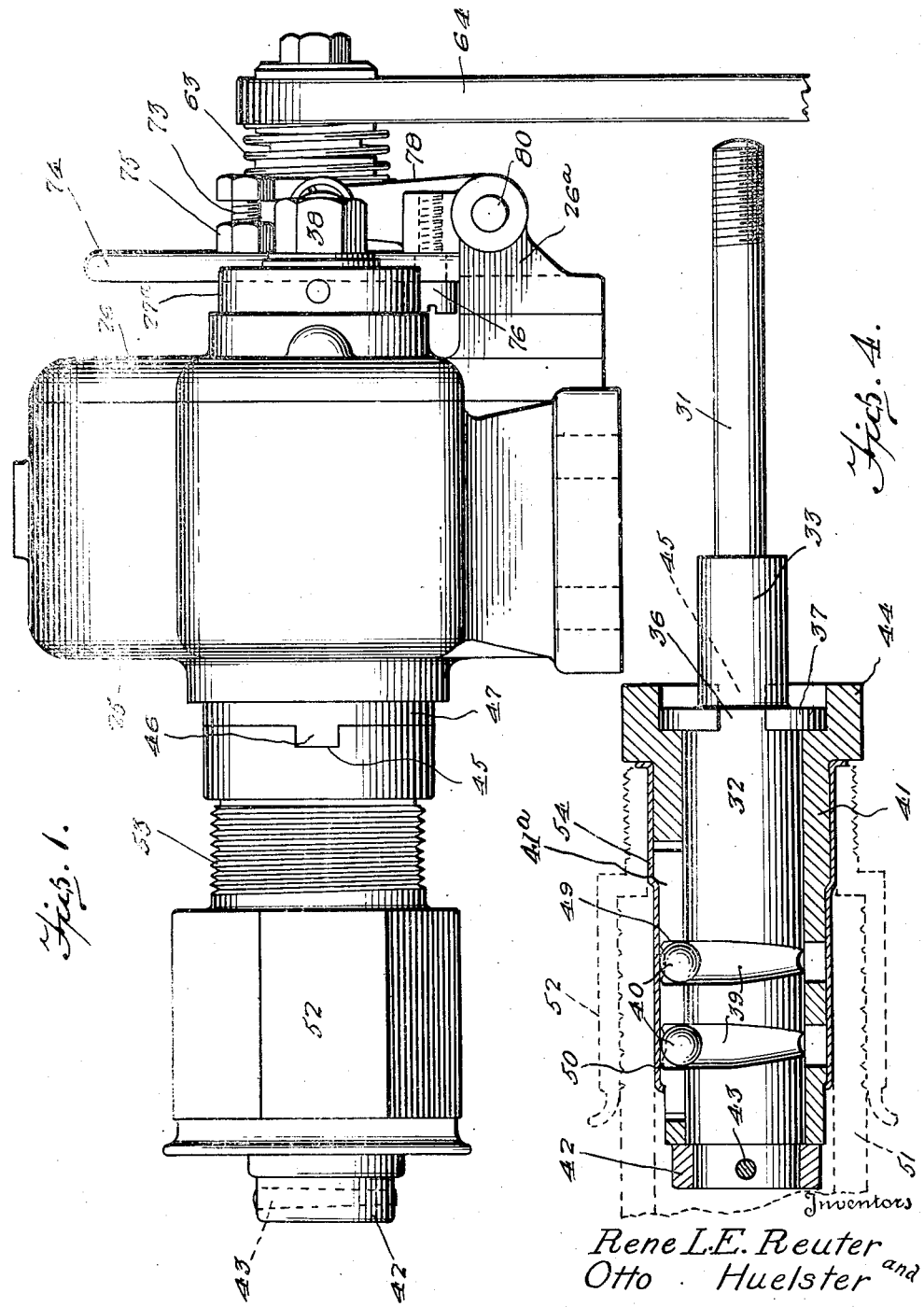

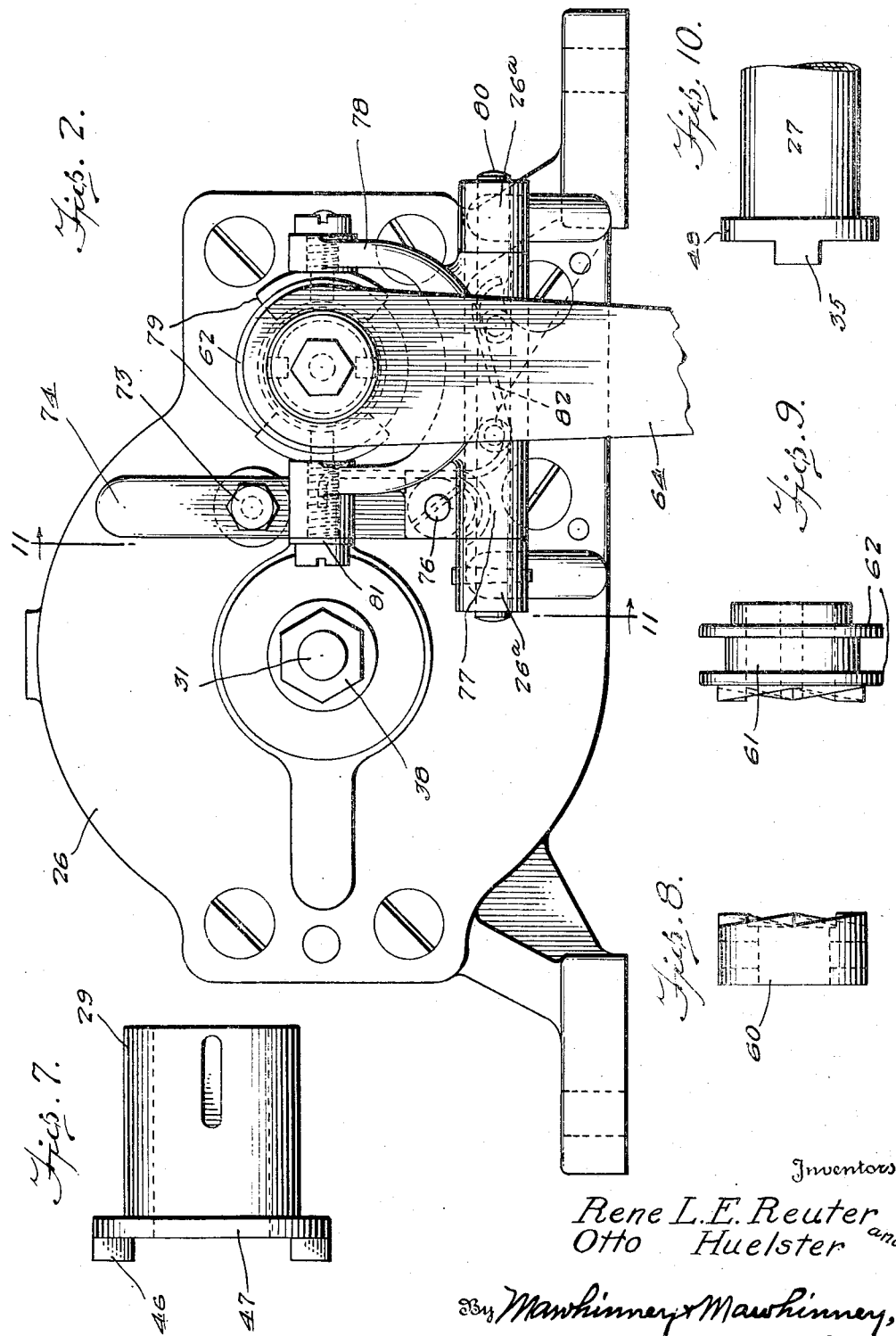

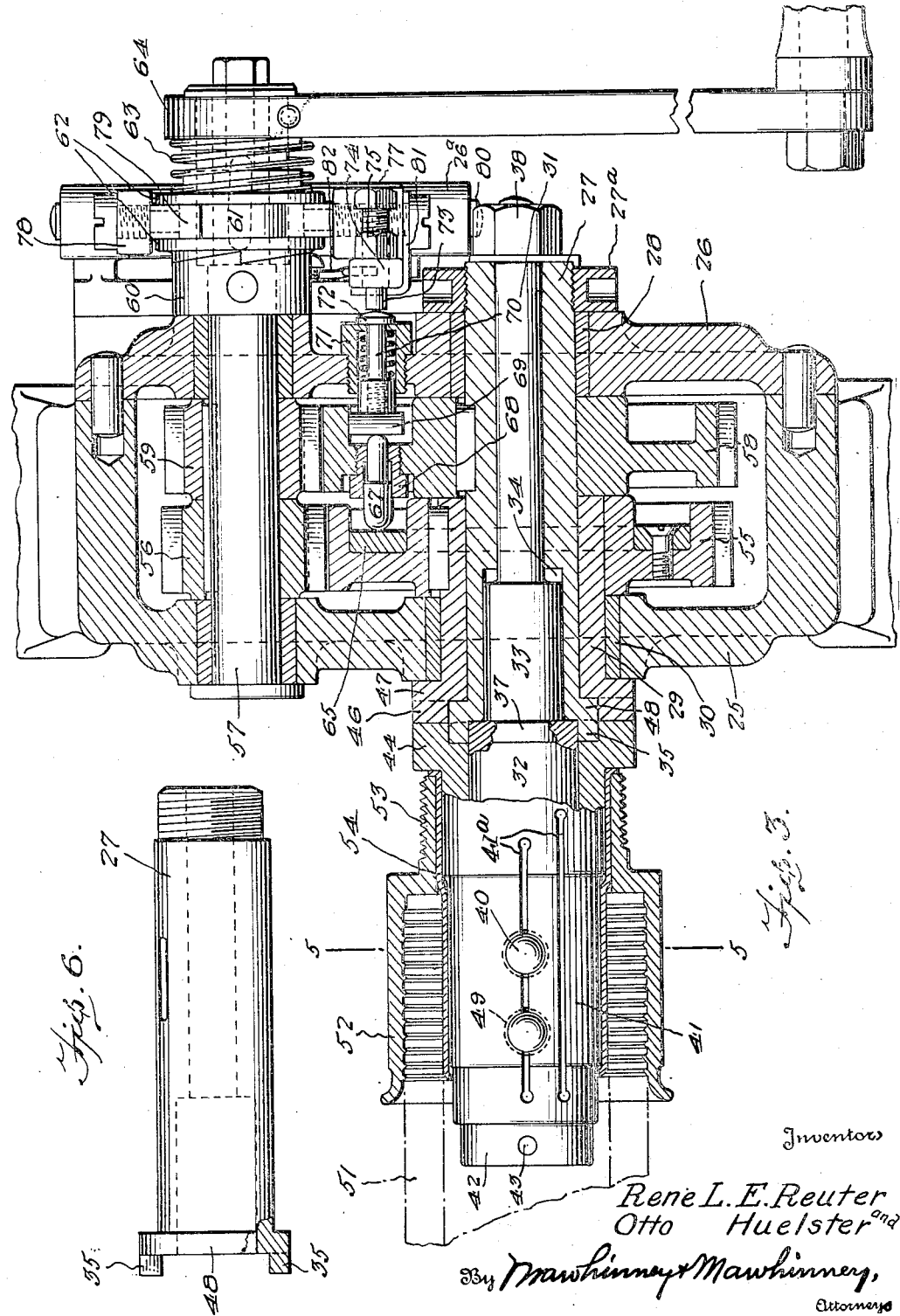

Inventors
Rene L. E. Reuter
Otto Huelster and
By Mawhinney & Mawhinney,
Attorneys Patented Dec. 19, 1939

2,183,921

UNITED STATES PATENT OFFICE 2,183,921

TUBE DEFORMER

René L. E. Reuter and Otto Huelster, Waterbury, Conn., assignors to Scovill Manufacturing Company, Waterbury, Conn., a corporation of Connecticut Application June 28, 1937, Serial No. 150,856

12 Claims. (Cl. 153—79)

The present invention relates to deformers for tubes, couplings for hose and pipes, and the like, wherein the wall of the tube or coupling is grooved or deformed to interfit with hose, pipes, or other parts between which a tight, strong and even sealed connection is desired.

The present invention relates to certain improvements and additions made with respect to the tube deformer disclosed in the application of Albert J. Scholtes, filed December 1, 1936, Serial No. 113,732.

An object of the present invention is to provide a tube deformer which may be operated with a minimum expenditure of energy or power, and a machine which is adapted for use with tubes, couplings and the like of different sizes incident to the detachable and interchangeable mounting of companion mandrels and sleeves upon the machine corresponding to the sizes of the articles to be deformed.

In the above referred to Scholtes invention the tool or machine embodied no means for arresting the operation after a complete cycle was attained so that should the machine over-run it is necessary that a second complete cycle of operation be performed before the article could be released from the machine. It is, therefore, another object of this invention to overcome this fault and to provide means for automatically throwing out the operative parts of the machine immediately upon the completion of each cycle and to maintain the parts in inoperative position until they are manually released so as to provide an automatic means for determining the correct positions of the parts for the withdrawal and substitution of the articles from the machine.

Another object of the invention is to provide a machine embodying these characteristics and which is relatively small and compact so that the machine may be easily mounted upon a work bench, a frame, or other convenient point of access, and wherein the parts are relatively few and are so constructed and assembled that the parts may be made of sufficient size and strength to withstand the various loads and pressures imposed on them in the operation of the deformer.

With the foregoing and other objects in view, the invention will be more fully described hereinafter, and will be more particularly pointed out in the claims appended hereto.

In the drawings, wherein like symbols refer to like or corresponding parts throughout the several views, Fig. 1 is a side elevation of a tube deformer embodying the features of the present invention, showing a hose coupling applied thereto;

Figure 2 is an end elevation of the same showing the outer end of the tool or machine to which the operating handle and throw-out mechanism is attached;

Figure 3 is a horizontal section taken through the machine with the hose coupling applied thereto;

Figure 4 is a detail sectional view taken through the mandrel and ball-carrying sleeve in assembled relation, the same being shown for one size of article to be deformed;

Figure 6 is a detail side elevation of the mandrel holding and interlocking shaft of the machine;

Figure 7 is a detail top plan view of the sleeve shaft of the machine for interlocking engagement with the ball-carrying sleeve of Figure 4;

Figure 8 is a detail side elevation of the fixed clutch collar for the operating shaft of the machine;

Figure 9 is a similar view of the shiftable clutch collar for the operating shaft of the machine;

Figure 10 is a fragmentary side elevation of the outer end of the mandrel carrying shaft, the view being taken axially at right angles to Figure 6;

Figure 11:
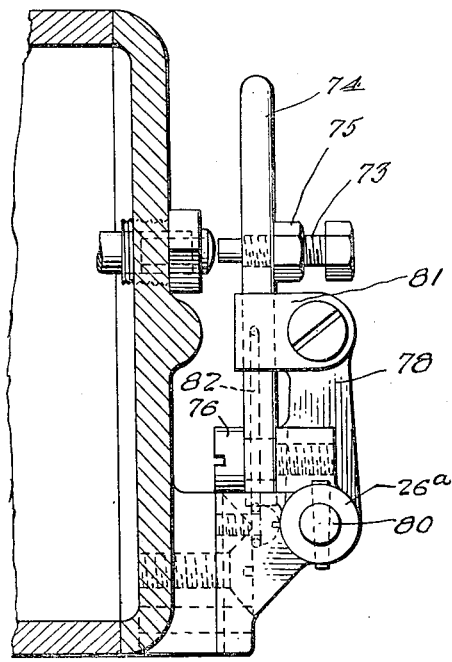
Figure 11 is a fragmentary sectional view taken vertically through the outer end of the machine substantially on the line 11—11 of Figure 2, showing the yoke and the throw-off lever for releasing the clutch of the operating shaft.
Figure 12:
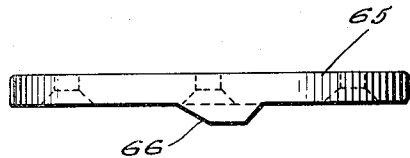
Figure 12 is a detail edge view of the cam ring mounted on the gear wheel of the hollow machine shaft for operating the clutch mechanism at a predetermined time.
Figure 13:
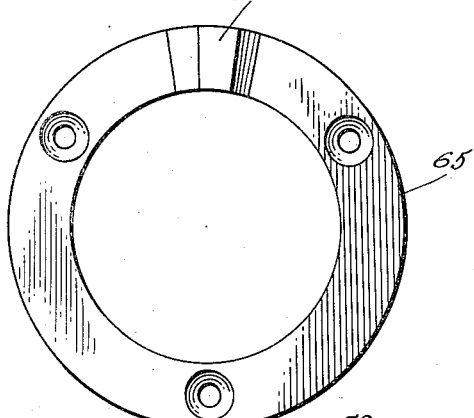
Figure 13 is a face view of the same.
Figure 14:
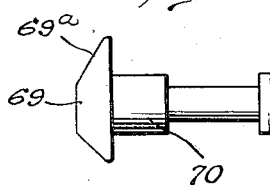
Figure 14 is a detail side elevation of the beveled head thrust transmission pin mounted in the end of the casing and comprising part of the clutch releasing mechanism.

Referring now to the drawings, 25 designates a casing or housing of any suitable form and construction for supporting and enclosing the parts of the tool or machine. A cover plate 26 is secured in any suitable manner to the rear open side of the casing 25 for not only closing the latter but also to support certain structural elements of the machine as will appear.

Figure 5:
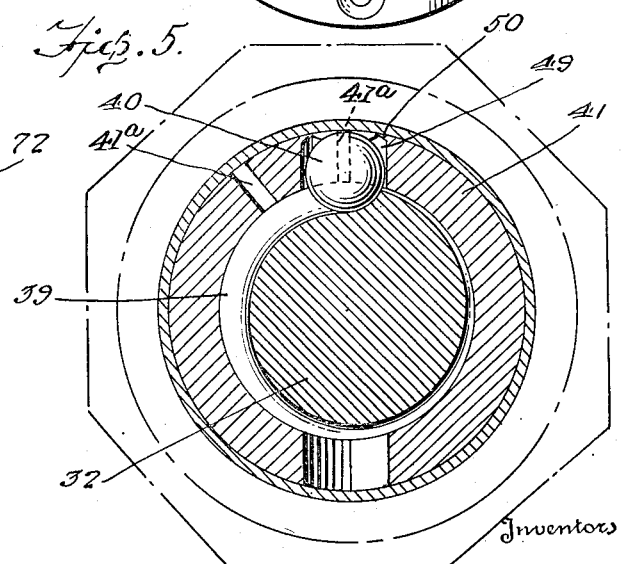
Figure 5 is an enlarged transverse section taken through the mandrel and sleeve as applied to the hose coupling, the section being taken on the line 5—5 of Figure 3.
Figure 15:
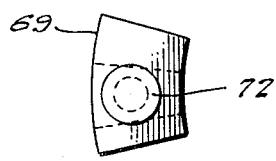
Figure 15 is a head end view of the same.

Disposed transversely through one end portion of the housing 25 is a shaft 27 which, at its rear end, is supported in a bushing 28 provided in the cover 26 and which at its forward end is supported rotatably in a short sleeve shaft 29 mounted upon a bushing 30 in the front wall of the casing 25. The shaft 27 is provided with an axial bore into which is removably fitted the shank 31 of a mandrel 32, and between the shank and mandrel, the latter is provided with an enlarged bearing portion 33 removably fitted in a counter-bore 34 provided in the front or forward end of the shaft 27. The forward end of the shaft 27 has outstanding lugs or detents 35 which interfit in corresponding recesses or sockets 36 provided in an outstanding annular flange 37 provided upon the inner end of the mandrel 32 so as to interlock the mandrel 32 to the shaft 27. The rear end of the mandrel shank 31 is threaded for the reception of a retaining nut 38 which is turned up against the rear end of the shaft 27 to detachably hold the mandrel therein. The mandrel 32, as shown particularly in Figures 4 and 5, is provided with one or more circumferentially tapering grooves 39 which receive the inner sides of balls 40, or other suitable rolling elements. One end of each groove 39 is of the desired depth and the groove gradually tapers in depth throughout substantially the circumference of the mandrel 32 until the groove practically approaches the peripheral surface of the mandrel so that when the mandrel 32 is rotated within the ball 40, and relatively to the axis thereof, the ball is gradually advanced radially upon the mandrel.

Surrounding the mandrel is a ball-carrying sleeve 41 which is freely rotatable thereabout and at its rear end abuts the flange 37 of the mandrel and at its forward end engages a retaining ring 42 which is secured by a transverse pin 43 or the like upon the outer end of the mandrel to maintain the sleeve from axial movement on the mandrel. The inner end of the sleeve 41 is provided with an over-hanging flange 44 which engages about the flange 37 of the mandrel and extends beyond the same a short distance and has at its inner edge recesses or sockets 45 for the reception of lugs or detents 46 provided upon the forward end of the sleeve shaft 29 of the machine. The detents 46 are carried upon a flange 47 provided on the forward end of the sleeve shaft 29 for abutting engagement against a flange 48 on the forward end of the shaft 27 of the machine, the flange 48 carrying the lugs 35. The sleeve shaft 29 is thus held in place in its bushing 30 by the flanges 47 and 48 and the mandrel 32 is locked to its shaft 27 independently of the locking of the sleeve 41 to the sleeve shaft 29.

The mandrel sleeve 41 is provided with a radial socket or opening 49 extending through one side thereof in register with the adjacent mandrel groove 39 and is of sufficient diameter to freely receive therein the ball 40. The sleeve 41, at the outer marginal edge of the socket 49, is provided with a lip 50 reducing the outer end of the socket 49 slightly as compared with the diameter of the ball 40 to hold the latter from complete removal from the socket 49. The ball 40 is preferably introduced into the socket 49 from the interior of the sleeve 41 by first rotating said sleeve 41 to bring the socket 49 to its lowermost position, and then inserting the ball 40 into the socket from the interior of the sleeve 41 before the mandrel 32 is assembled in place. However, if desired, the ball 40 may equally as well be inserted in the socket 49 from the outside by merely springing that portion of the metal stock included between the two spaced apart longitudinal slots 41a cut through the side of the sleeve 41, with one slot 41a intersecting the sockets 49, sufficiently to allow said ball to slip past the lip 50. The lip 50 is produced in the drilling operation of the hole 49 by stopping the drill just short of clearing entirely through said hole 49.

In Figures 3 and 4, two balls 40 are shown, and the mandrel 32 is thus provided with two grooves 39, one for each ball so that in the operation of the machine the balls may operate independently to form two separate and spaced apart, outwardly pressed grooves in the tube, pipe or other object which is mounted on the mandrel sleeve.

In the present illustration, the machine is shown with a hose coupling applied thereto, and wherein the broken lines indicate a hose 51 having its end inserted in a coupling nut 52 provided on its free end with a reduced threaded nipple 53 and having interiorly a bendable, metal tube 54, the latter adapted to fit over the mandrel sleeve 41. When the machine is operated, the groove, or grooves, is formed in the tube 54 so that the latter is crimped into the inner surface of the hose 51 to effectively secure the hose end in the coupling nut 52 and to also seal the hose in the coupling.

The sleeve shaft 29 in the casing has keyed to it a relatively large gear wheel 55 which meshes with a pinion 56 secured upon an operating or drive shaft 57 which is mounted through the casing and its cover 26 in spaced parallel relation to the shafts 27 and 29. The shaft 27 is connected, rearwardly of the sleeve shaft 29, directly to a large gear wheel 58 which meshes with a pinion 59 keyed upon the drive shaft 57. The gear wheel 58 is of slightly larger diameter than the gear wheel 55 and the pinion 59 is of correspondingly reduced diameter as compared to the pinion 56. As the pinions 56 and 59 are driven together upon the shaft 57, and at the same rate of speed, the shaft 27 will be turned at a slightly slower rate of rotation than will the sleeve shaft 29. The result of this construction is that the mandrel 32 will be turned at a slightly less rate of speed than its sleeve 41 so that the ball 40 will be gradually advanced in a radial direction as the mandrel and sleeve are turned, and it will require a number of revolutions to bring the mandrel and sleeve back into the normal ball retracted positions shown in Figure 5.

The drive shaft 57 is provided on its rear end with a fixed clutch collar 60 which may be pinned or otherwise suitably secured thereto as shown. The collar 60 is provided with ratchet teeth at its rear face for interlocking engagement with ratchet teeth provided on a shiftable or sliding collar 61 keyed upon the rear end of the shaft 57 and comprising the shiftable element or member of the clutch. The collar 61 is provided with a pair of spaced flanges 62 providing an annular groove therebetween, and the collar 61 is normally urged into clutching engagement with the fixed collar 60 by a spring 63 bearing at one end against the collar 61 and at its other end against a hand crank 64 or the like which is mounted upon the rear end of the drive shaft 57.

Secured in one side of the gear wheel 55 is a cam ring 65 having a projection 66 on its exposed surface. The projection 66 is adapted at times to engage the end of a pin 67 which is slidably mounted in a bushing 68 disposed transversely in the web of the gear wheel 58 and in transverse alignment with the cam ring 65. The rear end of the pin 67 is disposed in the path of a beveled head 69 of a spring pressed pin 70 mounted in a bushing 71 in the cover plate 26 of the casing. As the two gears, 55 and 58, approach the limit of a complete cycle of operations, the pin 67 is adapted to engage the projection 66 of the cam ring 65 when the projection 66 forces the pin 67 to the rear, or to the right, as viewed in Fig. 3 in bushing 68. During the interval that the pin is riding over the top flat surface of the projection 66, the gear 58 carries the depressed pin 67 into engagement with the inclined face 69a of head 69, forcing the pin 70 to the rear against the influence of its spring, as the flattened top surface of the head 69 is approached by the adjacent end of the pin 67. The pin 70 is provided with a head 72 on its rear end adapted to engage an adjustable stop 73 which may comprise the end of a screw threaded through a lever 74 and fixed in adjusted position thereon by a lock nut 75, as shown in Figure 11. The lever 74 at its lower end is pivotally mounted by a screw 76 upon a yoke collar 77 which is provided with a pair of arms 78 embracing the opposite sides of the shiftable clutch collar 61 and having shoes 79 projecting between the flanges 62 of the clutch collar. The yoke collar 77 is pivotally mounted upon a pin 80 carried upon bearing brackets 26a attached to the rear side of the cover plate 26 transversely of the machine so that when the lever 74 is forced backwardly by the registering pins, the yoke is rocked backwardly to withdraw the clutch collar 61 from engagement with the clutch collar 60 so as to release the drive shaft and consequently stop the operation of the gears and other parts of the machine when a predetermined position of the gears is reached.

The lever 74 is normally held in upright position in register with the pin 70 by a stop clip 81 which may be secured to one of the yoke arms 78, as shown in Figures 2, 3 and 11, and the lever 74 may be swung out of engagement with the stop clip 81 so as to move the stop screw 73 out of line with the pins so that the spring 63 is free to return the clutch collar 61 into its interlocking position. The stop screw 73 will thus engage the side of the head 72 of the rearmost pin 70 and as soon as the turning of the handle 64 is recommenced sufficiently to move the cam ring 65 with its projections 66 out of line with the pin 67, the pin 70 is projected forwardly by its spring to release the lever 74 and the latter is then returned to its normal upright position in the stop clip 81 by a spring 82 which is carried upon the yoke 77 and which extends upwardly at the inner side of the lever 74 to yieldingly urge the latter toward the stop clip 81.

In operation, the object, such as a hose coupling as shown in Figures 3, 4 and 5, is slipped over the mandrel sleeve 41 with the coupling tube 54 adjacent the sleeve 41, and held in any suitable manner against turning.

The hand crank 64 is now turned to rotate the operating or drive shaft 57 through the clutch collars 61 and 60. The pinions 56 and 59 turn with the shaft 57 and, being of different sizes, turn their respective gears 55 and 58 at different speeds of rotation with the gear 55 turning at a slightly greater rate than the gear 58. Consequently, the shaft 27 turns slower than the sleeve shaft 29 and the mandrel 32, interlocked to the shaft 27, lags behind the mandrel sleeve 41 which is connected to the sleeve shaft 29. The ball 40 is carried in the socket 49 in the sleeve 41 around the mandrel 32 gradually as the mandrel and sleeve turn in the same direction. The number of revolutions of the mandrel and sleeve to carry the ball 40 over the entire surface of the groove or cam 39 is dependent upon the difference between the ratios of the sizes of the pinions 56 and 59 to the sizes of their respective gears 55 and 58. In the present illustration these ratios are relatively close so that a large number of revolutions are required to complete the cycle of operation. This considerably reduces the effort required to operate the machine or tool, and the relative sizes of the pinions 56 and 59 and the gears 55 and 58 may be varied to obtain different working efforts or pressures as desired.

The tube 54 to be grooved or crimped outwardly is slipped over the mandrel sleeve 41 when the machine is in tube releasing position, wherein the ball 40 is in the fully retracted position shown in Figures 4 and 5. This is the position assumed by the machine at the end and at the beginning of a cycle of operation.

To start the machine, the release lever 74 is swung out of the stop clip 81 and out of the path of the stationary pin 70 so that the clutch spring 63 may slide the clutch sleeve 61 into interlocking engagement with the clutch sleeve 60 on the drive shaft 57. The crank handle 64 may now turn the shaft 57 and the gears in the casing 25. The gears 55 and 58 turn in the same direction with the gear 55 turning slightly faster than the gear 58. The pin 67 is carried by its gear 58 past the beveled head 69 of the pin 70 so that the latter moves forward under pressure of its spring and clears the stop screw 73 of the lever 74. The lever 74 now returns, under action of its spring 82 into the stop clip 81 and into line with the pin 70.

Upon each complete turn of the gear 58 the pin 67 thereof passes over the beveled head 69 of the stationary pin 70 depressing the latter against the influence of its spring. When the gear 55 has turned sufficiently to bring the projection 66 of cam ring 65 into alignment with the pin 67, and while the pin 67 is still engaged against the top flat surface of the projection 66, the pin 67 is carried by the rotation of gear 58 into camming engagement with the head 69 of pin 70 to depress the same against the stop screw 73 of the lever 74. This action swings the lever 74 and the yoke 78, on which the lever is mounted, and shifts the clutch collar or sleeve 61 away from the collar or sleeve 60 so that the shaft 57 cannot be further turned by the handle 64. The disengagement of the members 60 and 61 and light turning of the handle is an indication that the grooving operation is completed, and that the tube 54, or other object worked upon, is freed and ready to be withdrawn from the mandrel sleeve 41. It is to be noted here that a definite timing relationship exists between the position of the ball 40 in the deepest part of groove 39 and the alining state of the pin 67, 70 and projection 66. That is, when the projection 66 and pin 67 are in alined registry, the ball 40 approaches the limit of the highest radial point on the groove 39, and as the pin 67 is moving into alinement with pin 70 to throw out the clutch, the ball 40 will have cleared the pinnacle of the groove 37 and dropped into the deepest part of said groove, and there remain stationary regardless of the number of additional ineffective turns the operating handle 64 may make.

Another object is interchanged with the tube 54, the lever 74 is swung laterally out of its clip 81, and the operation may be repeated.

The mandrel 32 and its sleeve 41 are the expander elements and may be made in sets of desired size to accommodate hose couplings, tubes, and the like, of various internal diameters, the expander elements being interchangeable in the machine for taking care of the various sizes of the objects to be worked upon. As the mandrel sleeve 41 is permanently connected to its respective mandrel 32 by the pinned ring 42, the single nut 38 is all that is required to be removed for admitting the withdrawal of the mandrel 32 from the shaft 27 and the mandrel sleeve 41 from the sleeve shaft 29. The different sized mandrels and sleeves all have the same size flanges 37 and 44 to interfit with the flanges 48 and 47 of the machine shafts 27 and 29, respectively. A quick interchange of the mandrels and sleeves may be thus effected.

The driven shaft 27 of the machine is permanently secured in the casing 25 in any suitable manner, as by threads on the rear end of the shaft 27 and a nut 27a thereon bearing against the cover 26 of the casing. Practically the only pressure transmitted through the rolling element 40 is radial, and this pressure is taken up directly by the mandrel 32 which may be of solid construction, as shown, and which has all necessary strength even when of very small diameter for operation on small diameter tubes. There are no pressure transmitting parts of small dimensions, or subject to leverage action, in the machine, so that the machine is capable of long life and subjected to a minimum of wear. Heretofore, various attempts have been made to expand or roll beads outwardly from within tubes, and the like. They have proved unsuccessful because the structure of the expanders could not be made large enough to withstand the strains imposed, and longitudinally shiftable cores with expanding cones created too much friction for practical purposes and had a tendency to distort and destroy the tube and the parts of the apparatus. Furthermore, the means required for the shifting of the cores requires too much space and leverage to be practical.

From the above description of the present invention it will be readily understood that there cannot be any longitudinal thrust or strain as there is no longitudinal movement or cones. The rolling elements 40 reduce friction to a minimum, advance radially only, and the radial movement is so gradual that the force required is extremely small. Also pressure is exerted only radially inward against the mandrel and there is no longitudinal effect to pull or thrust apart any of the parts of the machine or tool. The tapering groove or cam 39 on the mandrel 32 extending circumferentially is the only zone of pressure in the entire mechanism. This pressure is radial only through the ball 40 and directly into the mandrel 32 which can well withstand all possible radial pressures set up by the circumferential cam action.

What is claimed is:

1. In a tube deformer, an expander unit having relatively rotable operating members, driven elements detachably connected to the respective expander members and adapted to be driven at different rates of speed for relatively rotating the expander members, and stop motion means operable upon the relative turning of the expander members to a predetermined extent to free the same from being driven.

2. In a tube deformer, coaxial socketed shafts, means for driving the shafts at relatively different speeds, and an expander unit including a mandrel with a circumferential cam, a sleeve on the mandrel, and a rolling element carried by the sleeve in the plane of the cam, said mandrel and sleeve having socket portions relatively complemental to said socket shafts for detachable interlocking engagement therewith.

3. In a tube deformer, an expander unit including concentric members, coaxial shaft elements, said members and elements having relatively detachably interlocked portions, operating means for turning the shaft elements at relatively different speeds, and means for releasing the operating means from the shaft elements upon a predetermined relative rotation of the expander members.

4. In a tube deformer, an expander unit including concentric members, coaxial shaft elements, said members and elements having relatively detachably interlocked portions, operating means for turning the shaft elements at relatively different speeds, and means for releasing the expander members from the operating means upon a predetermined relative rotation of the shaft elements.

5. In a tube deformer a pair of coaxial shaft elements each having a gear thereon and the gears being of different sizes, an expander unit having a mandrel for detachable connection with one shaft element and a sleeve surrounding the mandrel for detachable connection with the other shaft element, a drive shaft having pinions thereon of different sizes meshing respectively with said gears to drive the shaft elements at different rates of speed from the drive shaft, turning means for the drive shaft, a clutch connection between the turning means and the drive shaft normally interlocking the same for turning the drive shaft, and automatic clutch release means disposed between said gears and the clutch for releasing the latter from the drive shaft upon a predetermined relative rotation of said gears.

6. In a tube deformer a shaft having a gear thereon, a hollow shaft disposed about one end of the first shaft and having a gear thereon of a different size than said first gear, a mandrel detachably mounted on said first shaft, a sleeve surrounding the mandrel and detachably connected to said hollow shaft, an expanding element carried between the mandrel and the sleeve for operation upon the interior of a tube, a drive shaft having a pair of pinions thereon of different sizes corresponding to the difference in size of said gears to drive the latter at different speeds from the drive shaft, turning means for the drive shaft, a normally closed clutch connecting the turning means to the drive shaft, a plurality of transverse pins disposed relatively to the clutch and including a pin in one of said gears, said pins adapted at times to align with one another, and a cam projection carried by the other gear adapted upon a predetermined relative rotation of the gears to align with said pins for shifting the same and releasing the clutch.

7. In a tube deformer, an expander unit including a mandrel and a sleeve thereon, coaxial driven shafts detachably connected to the mandrel and sleeve respectively admitting of interchange of mandrels and sleeves of different sizes, a drive shaft, connections between the driven shafts and the drive shaft for turning the driven shafts at different rates of speed from the drive shaft, a handle for rotating the drive shaft, a normally closed clutch between the handle and drive shaft, a yoke pivotally mounted adjacent the clutch and engaging the same, a releasable lever on the yoke, a series of pins carried by said connection between the driven and drive shafts, said pins adapted for alinement upon completion of each cycle of operation of the driven shafts with the lever, and cam means disposed between the drive and the driven shafts operable upon said pins to depress said lever and swing said yoke to release the clutch upon the predetermined relative turning movements of said driven shafts.

8. In a tube deformer, an expansion unit including a mandrel with a sleeve thereabout and a radially movable deforming element adapted at one relative position of the mandrel and sleeve to lie below the surface of the sleeve and admit interchange of tubes upon the sleeve, a pair of shaft elements connected to the mandrel and sleeve respectively, a drive shaft, gears of different sizes disposed between the drive shaft and said first shafts for turning the mandrel and the sleeve at different rates of speed, an operating device for turning the shaft, a normally closed clutch between the operating device and the drive shaft, and clutch releasing means including operating parts carried by said gears adapted to be brought into cooperative positions upon the relative turning of the mandrel and sleeve into said position of retraction of the deforming element.

9. In a tube deformer, an expander unit adapted for positioning within a tube to be grooved and including a mandrel and a sleeve, a casing, a pair of coaxial shafts mounted in the casing for detachable interlocking engagement with said mandrel and sleeve respectively, a gear mounted on each coaxial shaft and the gears being of different sizes, a drive shaft mounted in the casing and having pinions of different sizes meshing with the respective gears for turning the coaxial shafts with the mandrel and sleeve at different speeds of rotation from the drive shaft, turning means for the drive shaft, a clutch between the turning means and the drive shaft biased to a closed position, a yoke mounted on the casing engaging the clutch, a lever mounted on the yoke for swinging in one direction therewith and pivotally supported for swinging laterally of the yoke, a stop carried by the yoke for said lever, a spring disposed between the yoke and the lever for normally holding the latter against the stop, a shiftable pin carried by the casing in line with said lever when in normal position, a second pin carried by one of said gears adapted at times upon rotation of the gear to align with said first pin, and a laterally disposed cam projection carried by the other gear adapted upon the predetermined relative rotation of the gears to align with said pins when the latter are in alignment for shifting said pins against said lever to swing the yoke and release the clutch.

10. In a tube deformer, a deforming unit having concentric members, a gear casing, a long shaft mounted in the gear casing for detachable engagement with one of said deformer unit members, a sleeve shaft mounted in the casing about said first shaft for detachable engagement with the other member of the deformer unit, a gear carried by said first shaft, a second gear mounted on the sleeve shaft and being of a different size from the first gear, a drive shaft mounted in the casing having pinions thereon of different sizes meshing respectively with said first and second gear, a handle for turning the drive shaft, a normally closed clutch between the handle and the drive shaft, a yoke mounted in the casing connected to the clutch, a lever pivotally mounted on the yoke for swinging therewith and adapted to be pivoted transversely of the yoke, means for normally holding the lever in upright normal position, a spring pressed stop pin carried by the casing in line with said lever, a second pin slidably mounted through said first gear adapted to align at times upon rotation of the gear with said first pin, said first pin having a beveled head for receiving said second pin thereover, and a cam ring mounted in the side of the second gear and having a projection thereon adapted upon a predetermined relative rotation of said gears to align with said pins when in alignment for shifting said pins against the lever to swing the yoke and release said clutch.

11. In a tube deformer, a casing, a drive shaft mounted in the casing and having a pair of pinions thereon of different sizes, a handle for turning the shaft, a clutch between the handle and the shaft normally closed to interconnect the same, a pair of coaxial driven shafts mounted in the casing, a gear on one of said driven shafts meshing with one of said pinions, a second gear on the other driven concentric shaft meshing with the other pinion, an expander unit having relatively rotatable parts detachably interlocked respectively with the driven shafts, a transverse pin mounted in said first gear, a normally retracted pin mounted in the casing and having a head thereon adapted to be engaged by said first pin upon each revolution of the first gear, a yoke mounted on the casing having an abutment for engagement by said normally depressed pin when shifted to swing the yoke, said yoke connected to said clutch, and a cam projection on said second gear adapted upon the rotation of said second gear relative to the first gear to engage the pin of the first gear when the latter registers with the pin in the casing to shift said pins and rock said clutch operating yoke.

12. In a tube deformer, a casing, a hollow shaft mounted in the casing having locking lugs at one end, a detachable mandrel mounted at one end in the hollow shaft and having sockets receiving said lugs to detachably interlock said mandrel with the hollow shaft, a sleeve mounted to turn on the outer end of the mandrel and having sockets in its inner end, a sleeve shaft mounted on said hollow shaft and having lugs for detachable engagement in the sockets of the sleeve, gears of different sizes mounted on said hollow and sleeve shafts, a drive shaft mounted in the casing having pinions thereon of different sizes meshing with the respective gears, an operating handle for turning the shaft, a clutch between the handle and shaft for normally interlocking the same, and clutch opening means having cooperative parts on the casing and said gears adapted to release the clutch upon the predetermined relative rotations of the gears.

RENÉ L. E. REUTER.
OTTO HUELSTER.